3,429,671
METHOD OF TREATING CARBON CONTAINING MATERIAL
Charles V. Ellison, Delmont, and Benedict L. Vondra, Greensburg, Pa., assignors to Nuclear Materials and Equipment Corporation, Apollo, Pa., a corporation of Pennsylvania
No Drawing. Filed May 26, 1965, Ser. No. 459,097
U.S. Cl. 23—342
Int. Cl. C01g 43/00
7 Claims

ABSTRACT OF THE DISCLOSURE

The method of separating out uranium from uranium-carbonaceous material in the practice of which the material is mixed with a sodium salt such as NaCl or $Na_2CO_3$ to a temperature of about 800° C. to 860° C. to produce a fluffy yellow residue, $NA_2UO_4$, readily soluble in about 4 molar nitric acid.

---

This invention relates to the chemical separation of materials with emphasis on separating out the carbon from carbonaceous material. This invention has particular relationship and important significance to the derivation or isolation of uranium from carbon impurities with which it may be chemically and/or physically combined. While this invention is intimately concerned with the isolation or derivation of uranium from treatment-resistant uranium aggregates the practice of the teachings and concepts of this invention with materials of other types is regarded within its broader scope.

Uranium, particularly of the type enriched in $U^{235}$ is costly, and in the chemical handling of materials including uranium it is important that, to the extent practicable, loss of uranium, even in minute quantities, be avoided. In the use or in the treatment of uranium carbonaceous materials frequently form aggregates of carbon and uranium which are resistant to ordinary treatment. Typically, carbon-uranium aggregates are found in expended fuel elements. Such aggregates are also present in carbonaceous materials used with uranium such as filters used in wet chemical treatment of uranium compounds and in papers and rags used for wiping or cleaning or for other purposes in a laboratory. Some uranium compounds are also inflamatory and aggregates of carbon and uranium stubbornly resistant to ordinary treatment have been encountered following an accidental fire involving uranium. It is a specific object of this invention to provide a satisfactory method of separating or isolating uranium from treatment-resistant uranium-carbon aggregates.

Uranium may be separated from carbonaceous material by converting this material to a state in which the uranium may be dissolved out by water or other solvent. In accordance with the teachings of the prior art carbonaceous material containing uranium is burned, usually in oxygen, to oxidize the carbon leaving a uranium compound. But difficulty is encountered in producing a soluble clinker in this way. The time cycles for the effective burning are excessively long and frequently successive burnings are required to produce a soluble clinker. The dissolution time for the clinker resulting from oxidized carbonaceous uranium-containing material is long and the solution is frequently not clear. The carbonaceous material and the oxygen can produce an explosive mixture so that there is danger to personnel.

It is a specific object of this invention to overcome the above-described difficulties and to provide a low-cost, effective method, readily practiced without substantial supervision, for separating uranium from carbonaceous material containing uranium in the practice of which method the conversion of the uranium into the solute of a clear solution shall be effected in a reasonably short time without danger of explosion.

In accordance with an important aspect of this invention carbonaceous material containing uranium is converted into a fluffy powder readily soluble in water by roasting for several hours with sodium chloride at a temperature near the melting temperature of the salt, 801° C. The quantity of sodium chloride by weight should be equal to the weight of the carbon but this parameter is usually not known precisely. Desirably the aggregated treated be particulated to 50 or 60 mesh. Typically the sodium chloride and carbonaceous material are mixed in about equal quantities and the mixture is roasted at about 850° C. for three to three and one-half hours. Preferably the roasting should take place at least at 830° C. The resulting material is a yellow orange fluffy powder which produces a clear solution when dissolved in nitric acid. The concentration of the acid should be at least 4 molar.

Another salt which has proved highly satisfactory is sodium carbonate. The quantity of sodium carbonate which should be added should be about equal to the quantity of carbon estimated to be in the material. An excess of sodium carbonate produces a glassy material from which the uranium is not readily separated.

While the roasting with sodium chloride or sodium carbonate has been found to produce the most satisfactory results, moderate success has been achieved in separating uranium from carbonaceous material containing uranium by roasting with sodium iodide, potassium chloride, and sodium fluoride. While this process or method is in accordance with the specific aspects of this invention, peculiarly suitable for separating out uranium from carbonaceous uranium-containing material, it is, in accordance with the broader aspects of this invention, applicable to separating out carbon from other carbonaceous materials.

With respect to carbonaceous uranium-containing material the method according to this invention has the advantage that it is economical. Such salts as sodium chloride and sodium carbonate have a low cost. Alternatively MET–L–X fire retardant may be used. This retardant is composed of a mixture of sodium chloride and a plastic such as polyethylene or polypropylene. This also is a low cost material. The material or powder resulting from the roasting with the salt or first retardant is readily soluble in aqueous nitric acid solutions. A substantial quantity may be dissolved, in twenty-to-thirty minutes. The process is readily carried out by personnel which need not be highly skilled. Little supervision is required. There is no danger of explosion.

Without intending to limit this invention in any way it appears desirable to conjecture as to the chemical mechanism involved in the process according to the invention. The sodium chloride has a melting temperature of about 801° C. when the carbonaceous material is roasted with this salt, the salt penetrates between the molecules of the carbon breaking up the coating. The carbon is converted into carbon tetrachloride by reaction with the NaCl and the $CCl_4$ is emitted as a gas together with free chlorine. Sodium chloride is also sublimated. Since air is present the sodium chloride also react with the uranium to form sodium uranate, $Na_2UO_4$.

The sodium carbonate has a melting temperature of about 851° C. and decomposes above this temperature forming NaO and $CO_2$. The NaO breaks up the carbon forming $CO_2$ which is emitted as a gas and also forms $Na_2UO_4$. The sodium carbonate is preferred in this process to the sodium chloride because it does not result in the emission of corrosive chlorine and poisonous carbon tetrachloride.

Example 1

MET-L-X powder was used to extinguish a fire in which highly enriched uranium was present. The resulting mixture was to an extent soluble in concentrated nitric acid, but a 5 to 8% residue remained and in addition a mixture of $HNO_3$ and HCl resulted and the aqua regia produced attacked the stainless steel container of the material. The residue was found to be carbon coated spheres of uranium having a coating of carbon 16 to 17 microns thick. These spheres were insoluble in nitric acid.

50 grams of the MET-LI-X powder mixture derived from the fire and the compound $Al(NO_3)_3$ were heated in a furnace then the cycle presented in the following table, with the stated results, beginning at 9:00 a.m.

| Time: | Temperature, °C | Surface Condition |
| --- | --- | --- |
| 9:00 | Start | |
| 9:30 | 300 | Light gray color. |
| 10:00 | 500 | Sparking. |
| 10:30 | 700 | Fluffy-glassy. |
| 11:00 | 800 | Yellow fluffy. |
| 11:30 | 860 | Do. |

The resulting material when cooled was a soft, fluffy, yellow-orange colored powder weighing about 22.2 grams. This powder was very soluble in aqueous $HNO_3$ (4 molar) producing a clear solution with very slight residue. The solution contained 100 parts per million of chloride. 16 grams per liter of uranium, 3.4 p.p.m. hydrogen and about 25 p.p.m. of chlorine. The fluffy, yellow orange powder soluble in $HNO_3$ was substantially free of carbon.

Example 2

The same as Example 1 except that the temperature of the furnace was permitted to reach 800° C. instead of 860° C. and the treatment was stopped with no holding time at this point. The resulting material was dissolved and the solution filtered. The solid filtered out had a mass of less than .1 gram. There was chlorine in the solution of 2000 p.p.m.

Example 3

50 grams of the MET-L-X plus uranium derived from the fire was mixed with 50 grams of carbon coated sphere. The mixture was roasted for 3 to 3½ hours at 850° C. The result was 60 grams of an orange-yellow soft fluffy powder. Examination under a microscope revealed no sphere. The powder was dissolved in aqueous nitric acid and ten grams analyzed. 78 milliliters were found to have 85 grams per milliliter of uranium. The percent of uranium in the powder is given by $$\frac{.078 \times 85}{10} \times 100 = 66\%$$

This indicates the powder to have been $Na_2UO_4$ in which the uranium is about 68%.

Example 4

50 grams MET-L-X mixed with 50 grams of uranium spheres coated with 17 microns of carbon were maintained at 850° C. for three hours. The resulting material was a yellow-orange fluffy powder. 10 grams of the powder was dissolved in nitric acid in about 10 or 15 minutes and the solution filtered. Less than .1 gram of solids remained.

Example 5

A fuel element including carbon, uranium and niobium was treated. Six grams of the element was ground fine and mixed six grams of sodium chloride. Six grams of the element was ground coarse and treated with six grams of sodium chloride. Both mixtures were calcined as follows with the following observed changes:

(1) 600–700° C.—Little change in color only.
(2) 700° C.—No Cl melting and going to the bottom, fogging.
(3) 750° C.—NaCl losing identity, bubbling and fogging.
(4) 800° C.—No NaCl on top, red, bubbling and fogging.
(5) 850° C.—1 hr. Less volume, red, bubbling and fogging.
(6) 850° C.—2 hrs. Becoming orange, fogging.
(7) 850° C.—2½ hrs., cooled, weighed.

In each case an orange solid resulted. In the case of the fine ground element there was 0.8 gram powder; in the case of the coarse ground element there was 1.0 gram powder. The reductions in weight and volume were about the same; 6:1. The coarse material required more time to convert to powder.

In each case the orange powder was quickly dissolved in nitric acid (4 molar). The precipitate filtered out included niobium but no carbon.

Example 6

50 grams of MET-L-X powder mixture from the fire were roasted at 800° C. for 2 hrs. 15.3 grams of yellow powder resulted. Five grams of the yellow powder was dissolved in a liquid including 25 milliliters $H_2O$
20 milliliters $HNO_3$
20 milliliters $Al(NO_3)_3$
20 milliliters $H_2O$ The powder dissolved. The residue was too small to weigh. The solution included 18.7 grams per liter of uranium and 354 p.p.m. chlorine.

Example 7

13.3 grams of MET-L-X powder and 13.3 grams of carbon-coated uranium spheres were roasted at 800° C. for 2 hours. The resulting mass was then cooled and dissolved. There were no spheres in the residue.

Example 8

34.1 grams of carbon-coated uranium spheres and 34.1 grams of sodium chloride were roasted at 800° C. The resulting mass was cooled and dissolved. The solution was yellow. There were no spheres in the residue.

Example 9

Papers containing uranium were charred and then roasted with sodium chloride. Uranium was successfully separated from the charred mass.

Example 10

Filters, papers, asbestos, plastic containing uranium were charred and then roasted with sodium chloride. Uranium was successfully separated from the charred mass.

Example 11

Rags containing uranium were charred and then roasted with sodium chloride. Uranium was successfully separated from the charred mass.

Example 12

The following Table I presents the results achieved in removing carbon in roasting carbon spheres and coated spheres with various salts.

TABLE I

| Salt | Material Treated | Result |
|---|---|---|
| NaCl | Graphite balls, powder | Carbon remained, good. |
| NaOH | Carbon-coated uranium spheres | Unsuccessful. |
| NaCl | do | No spheres remained, good. |
| NaI | do | Spheres remained, iodine fumes, fair. |
| KI | do | Unsuccessful, solid mass, iodine fumes. |
| KCl | do | Solid mass, fogging, fair. |
| NaF | do | Corrosive white solid, no spheres, fair. |
| $Na_2CO_3$ | do | Some spheres, but successful if proper quantity of salt is used. |

Example 13

The following Table II represents more comprehensive data on treatment of carbon and uranium carbide plus carbon with various salts.

TABLE II

| Type of Operation | (1) Eqpt. | (2) Chemicals 1 | (3) Chemicals 2 | (4) Wts. 1 | (4) Gms. 2 | (5) U Present, Percent | (6) Time, min. |
|---|---|---|---|---|---|---|---|
| Roasting | Inconel | $UC_2+C$ | $Na_2CO_3$ | 10 | 10 | Est. 50% | 120 |
| $Na_2CO_3$ | do | | | | | | 120 |
| Roasting | Alundum | $UC_2+C$ | $Na_2CO_3$ | 12 | 6 | Est. 80% | 120 |
| Do | do | $UC_2+C$ | $NaHCO_3$ | 5 | 2 | do | 30 |
| $NaHCO_3$, Diss | do | $H_2O$, 70° | $HNO_3$ | 15 ml | 10 ml | | 30 |
| Roasting | Inconel | $UC_2+C$ | $NaHCO_3$ | 15 | 3 | Est. 80% | 60 |
| Diss | do | $H_2O$, 70° | $HNO_3$ | 25 ml | 20 ml | | 30 |
| Roasting | do | $UC_2+C$ | $NaHCO_3$ | 15 | 5 | Est. 80% | 60 |
| Diss | do | $H_2O$, 70° | $HNO_3$ | 25 ml | 20 ml | | 30 |
| Roasting | Alundum | $UC_2+C$ | $K_2CO_3$ | 5 | 2 | Est. 80% | 60 |
| $K_2CO_3$, Diss | do | $H_2O$, 70° | $HNO_3$ | 20 ml | 15 ml | | 20 |
| Roasting | Inconel | $UC_2+C$ | $K_2CO_3$ | 15 | 6 | Est. 80% | 60 |
| | | | | | | | 60 |
| Diss | do | $H_2O$, 70° | $HNO_3$ | 25 ml | 20 ml | | 20 |
| Roasting | do | $UC_2+C$ | NaOH | 15 | 6 | Est. 80% | 120 |
| NaOH | do | | | | | | 120 |
| Diss., 5.0 gms | do | $H_2O$, 70° | $HNO_3$ | 30 ml | 20 ml | Est. 80% | 30 |
| Roasting | do | $UC_2+C$ | NaOH | 10 | 3 | do | 120 |
| Diss | do | $H_2O$, 70° | $HNO_3$ | 25 ml | 15 ml | | 60 |
| Roasting | Alundum | $UC_2+C$ | $Na_2CO_3$ | 5 | 5 | Est. 5% | 120 |
| Do | do | $UC_2+C$ | $NaHCO_3$ | 3 | 2, 1 ml | do | 120 |
| Diss | do | $H_2O$, 70° | $HFHNO_3$ | 20 ml | 20 ml | | 30 |
| Roasting | do | $UC_2+C$ | $NaHCO_3$ | 5 | 10 | Est. 80% | 120 |
| Diss | do | $H_2O$, 70° | $HNO_3$ | 25 ml | 20 ml | | 20 |
| Roasting | do | $UC_2+C$ | $Al(NO_3)_3$ | 5 | 5 | Est. 80% | 120 |
| $Al(NO_3)_3$, Diss | do | $H_2O$, 70° | $HNO_3,-MnO_2$ | 20 ml | 40 ml | | 20 |
| Roasting | do | $UC_2+C$ | $FeCl_3$ | 5 1-HF | 1-HF | Est. 80% | 120 |
| Fe, Diss | do | $H_2O$, 70° | $HNO_3$-HF | 30 ml | 20 ml | | 30 |
| Roasting | do | $UC_2+C$ | $FeSO_4(NH_4)_2SO_4$ | 5 | 2 | Est. 80% | 120 |
| Diss | do | $H_2O$, 70° | $HNO_3$-HF | 30-20-1 | | | 30 |
| Roasting | do | 100% C | $FeCl_3$ | 5 | 5 | 0% | 120 |
| Diss | do | $H_2O$, 70° | $HNO_3$-HF | 20-20-1 | | | 30 |
| Roasting | do | 100% C | $FeSO_4(NH_4)SO_4$ | 5 | 7 | 0% | 120 |
| Diss | do | $H_2O$, 70° | $HNO_3HF$ | 20-20-1 | | | 30 |

| Type of Operation | (7) Temp., °C. | (8) Color of Roast | (9) Eqpt. Cond. | (10) Roast Wt. (gms.) | (11) Solution Cond. | (12) Residue Wt. (gms.) | (13) Conclusions |
|---|---|---|---|---|---|---|---|
| Roasting | 850 | Yellow-brown | Stuck to tray | 17.0 | | | Too much chemical. |
| $Na_2CO_3$ | 850 | Yellow-orange | Some better | 12.5 | | | $Na_2CO_3$. |
| Roasting | 850 | Orange-yellow | Clean-dry | 12.3 | | | |
| Do | 850 | Yellow-dark | do | 5.1 | | | Not enough time at 850° C. |
| $NaHCO_3$, Diss | 100 | Clean-yellow | | | Not clean | 0.4 | At 850° C. |
| Roasting | 850 | Yellow-brown | Dry-few stains | 13.8 | | | Not enough time. |

TABLE II—Continued

| (1) Type of Operation | (7) Temp., °C. | (8) Color of Roast | (9) Eqpt. Cond. | (10) Roast Wt. (gms.) | (11) Solution Cond. | (12) Residue Wt. (gms.) | (13) Conclusions |
|---|---|---|---|---|---|---|---|
| Diss | 100 | Clean-yellow. | | | No RRT | 0.4 | Or may be chemical. |
| Roasting | 850 | Orange-yellow. | Dry-powder | 14.6 | | | Dissolution. |
| Diss | 100 | Clean-yellow. | | | No PPT | 0.2 | More NaHCO₃ than Na₂CO₃ needed. |
| Roasting | 850 | Orange-yellow. | Dry-powder | 5.6 | | | Heavy orange color. |
| K₂CO₃, Diss | 100 | Yellow | | | Clean | 0.2 | Adequate chemical. |
| Roasting | 850 | Orange | Glassy layer | | | | Recycled through again. |
| Roasting | 850 | Orange-yellow. | Dry-powder | 16.4 | | | Dissolution. |
| Diss | 100 | Yellow-fizzing. | | 16.4 | Clean | 0.3 | |
| Roasting | 850 | Black spots in yellow-brown. | Foaming scummy inside. | | | | Recycled through again. |
| NaOH | 850 | ...do... | Scum on sides | 17.3 | | | Poor, too much Na. |
| Diss., 5.0 gms | 100 | | | 5.0 | Dark brown | 0.3 | Sediment after 12 hrs. |
| Roasting | 850 | Fogging, bubbling, puffy, crusty yellow. | Scummy walls | 11.3 | | | Poor. |
| Diss | 100 | | | 5.0 | White, dingy | 0.2 | Slow to filter. |
| Roasting | 850 | Yellow-brown. | Dry-powder | 2.0 | | | Dry-powder. |
| Do | 850 | Dark-yellow. | ...do... | 1.4 | | | Do. |
| Diss | 100 | ...do... | | 1.4 | Not clean | 0.6 | Microscope, No C; Al, From boat. |
| Roasting | 850 | Orange-(Deep). | Dry-clean | 8.0 | | | Nice! Costly! |
| Diss | 100 | Yellow | | 8.0 | Fizzing clean | <0.1 | Nice! Costly! |
| Roasting | 850 | Dark-brown. | Scaly sides, boiled over, nasty. | 4.2 | | | Tray covered with scale, overflowed. |
| Al(NO₃)₃, Diss | 100 | ...do... | | 4.2 | Dark-pink | 0.6 | Nasty. |
| Roasting | 850 | Dark orange-black specks. | Coloration scum | 4.7 | | | Not good, nasty. |
| Fe, Diss | 100 | Dark-red-black. | | 4.7 | Very dark | 0.4 | Residue, 4,600 cts. U. |
| Roasting | 850 | Edges, orange, center, dark. | Fine-dry powder | 5.0 | | | More chemical needed. |
| Diss | 100 | ...do... | | 5.0 | Dark red | 0.6 | U=780 cts.; C=Flakes present. |
| Roasting | 850 | Black scales on top, fines bottom. | Stained-dry | 1.1 | | | Not enough. |
| Diss | 100 | ...do... | | 1.1 | Dark | 0.9 | 80% more chemical. |
| Roasting | 850 | Red specks in black or dark brown. | Dry-stained | 1.6 | | | Not enough chemical. |
| Diss | 100 | ...do... | | 1.6 | Dark | 1.6 | Do. |

In the left hand column of Table II the type of operation and reacting salt are listed. As indicated in this column the material is first roasted and then dissolved. The data on the roasting is presented along each row opposite the word "Roasting" and the data on the dissolving is presented along each row opposite the abbreviation "Diss." Column 1 presents the composition of the vessel in which the roasting was carried out. These vessels were of Inconel alloy and Alundum as indicated. Column 2 presents the material roasted and column 3 the reactant in the rows opposite "Roasting." Thus row 1 describes the roasting of uranium carbide and carbon. Column 4 presents the quantities of material and reactant in grams. To facilitate understanding of the relationship between columns 2 and 3 and 4, the material of column 1 is labeled (1) at the top and the corresponding quantities are in a sub-column of column 4 labeled "1." The reactants and their quantities are likewise in a column and a sub-column both labeled (2). Thus in the treatment described in row 2, 12 grams of $UC_2+C$ were treated with 6 grams of $Na_2CO_3$. In columns 2 and 3 opposite "Diss." the composition of the solvent, an aqueous acid solution, are listed. The quantities of water, which was at 70° C. and temperature, acid in milliliters are listed in the sub-columns labeled (1) and (2) respectively to correspond to the sublabeling of columns 2 and 3. Thus rows 5 and 6 describe roasting of 5 grams of $UC_2+C$ and 2 grams of $NaHCO_3$ and then dissolution in 15 milliliters of water and 10 milliliters of $HNO_3$. Column 5 presents the uranium in the material, column 6 the time of roasting and column 7 the temperature of roasting. Column 10 presents the weight of the roasted material and reactant and column 12 the weight of the residue in the solution.

TABLE III

| Type of Operation | (1) Used Eqpt. | (2) Chemicals Used #1 | (3) Chemicals Used #2 | (4) Wts. #1 | (4) Wts. #2 | (5) Est. U Present, Percent | (6) Time, Min. | (7) Temp., °C. | (8) Characs. of Roast | (9) Cond. of Eqpt. | (10) Roast Wt., gms. | (11) Solution Color Condition | (12) Residue Wt., gms. Color | (13) Conclusions |
|---|---|---|---|---|---|---|---|---|---|---|---|---|---|---|
| Roasting | Inconel | UC₂+C | Na₂CO₃ | 12 | 3 | Est. 40% | 120 | 850 | Dry powder, orange-yellow. | Clean and dry | 9.2 | | | Appears to be sufficient. |
| Diss. | Tray | H₂O, 70° | HNO₃ | 25 | 20 | | 20 | 100 | | | 9.2 | Yellow | 0.1 sand | Fizzing. |
| Roasting | Inconel | UC₂+C | Na₂CO₃ | 15 | 5 | Est. 40% | 120 | 850 | Hard, black, glassy (3:1). Orange powder. | | | | | Too much. |
| Diss. | Tray | H₂O, 70° | HNO₃ | +5 25 | 0 20 | do | 120 20 | 850 100 | | Clean and dry | 12.4 | | | 4:1 OK. |
| Roasting | Inconel | Spheres oil UC₂ | HNO₃ | 10 | 5 | Est. 40% | 120 | 850 | 2:1 | | 9.0 | Reddish-orange | | Too much chemical. |
| Diss. | Inconel | H₂O, 70° | HNO₃HF | 25 | 10 | Est. 40% | 20 | 100 | Yellow, clean | | | Yellow | 0.1 | U=1,146/m; H=1.6 N. |
| Roasting | Aluminum | UC₂+C | Na₂CO₃ | 5 | 2 | Est. 80% | 120 | 850 | Yellow-orange, dry, 2=5:1. | Clean, dry | 5.5 | | | Too much chemical. |
| Diss. | Inconel | H₂O, 70° | HNO₃ | 20 | 15 | | 30 | 100 | | | | Yellow | 0.1 | Clean solution. |
| Roasting | Inconel | UC₂+C | Na₂CO₃ | 12 | 3 | Est. 40% | 120 | 850 | Red-orange, C Chem. 4:1. | Clean and dry | 9.2 | | | Close to ratio. |
| Diss. | Inconel | H₂O, 70° | HNO₃ | 25 | 20 | | 20 | 100 | | Clean, 10 ml. to kill CO₃. Recycled thru furnace. | | Very yellow | 0.1 | 60 ml. sol, 109 9/8 U. |
| Roasting | Inconel | UC₂+C | Na₂CO₃ | 15 | 5 | Est. 40% | 120 | 850 | Glassy, hard, 3:1. Powder, 4:1. | Clean, dry | 12.4 | | | 3:1 ratio too high. |
| Diss. | Tray | H₂O, 70° | HNO₃HF | 5 | 0 | do | 120 | 850 | | Clean | | | | 4:1 better. |
| Roasting | Inconel | UC₂+C | Na₂CO₃ | 25 13 | 20 2 | Est. 80% | 20 120 | 100 850 | Dry powder, 6.5.1. | | 13.2 | | 0.1 | Clean solution. Less orange, limit. |
| Diss. | Inconel | H₂O, 70° | HNO₃ | 25 | 20 | | 20 | 100 | | Clean tray | | Yellow | 0.1 | About it. |
| Roasting | Inconel | UC₂+C | Na₂CO₃ | 13 | 2 | Est. 80% | 120 | 850 | Dry powder, 6.5.1. | | 13.6 | | | Works 6:1! |
| Repeat Diss. | Inconel | H₂O, 70° | HNO₃ | 25 | 20 | 0% | 20 | 100 | Dry, 1:1 | Clean | 0.1 | Yellow | 0.1 | Nice operation. |
| Roasting | Inconel | 100% C | Na₂CO₃ | 5 | 5 | | 120 | 850 | Dry, 5:3 | Clean | <0.1 | Lt. yellow | | Dark yellow. |
| Diss. | Inconel | H₂O, 70° | HNO₃ | 15 | 5 | 0% | 20 | 100 | Dry, 3:5 | Clean | 0.2 | Dark yellow | | Few grains sand. |
| Roasting | Inconel | 100% C | Na₂CO₃ | 3 | 3 | 0% | 120 | 850 | 1/4 boils, 1:1 | do | <0.1 | Scum | | Scum on tray. |
| Do | do | 100% C | Na₂CO₃ | 5 | 5 | 0% | 120 | 850 | Dry, 2.5:1 | do | <0.1 | | | Too light to weigh. |
| Do | do | 100% C | Na₂CO₃ | 5 | 5 | Est. 40% | 120 | 850 | Clean | do | 2.6 | Orange | | Need surface area or time |
| Do | do | UC₂+C | HNO₃ | 20 | 2 | | 2 | 100 | Dry, 5:1 | Clean, dry | 3.7 | Yellow | <0.1 | Too much Na₂CO₃. Do. |
| Do | do | UC₂+C | Na₂CO₃ | 5 | 1 | Est. 40% | 120 | 850 | Clean | Clean | 3.3 | Yellow | <0.1 | About it! |
| Do | do | H₂O | HNO₃ | 25 | 10 | | 2 | 100 | | | | | | Swell. |

Example 14

The following Table III presents comprehensive data on treatment of $UC_2$ plus C and carbon along with $Na_2CO_3$. The columns in Table III have the same significance as the corresponding columns in Table II.

While a preferred embodiment of this invention has been disclosed herein, many modifications thereof are feasible. This invention then is not to be restricted except insofar as is necessitated by the prior art.

What is claimed is:

1. The method of treating carbonaceous nuclear fuel material, containing treatment resistant aggregates of carbon and uranium to separate the uranium from the carbon which comprises mixing said aggregates with one of the class consisting of sodium chloride, sodium hydrogen carbonate ($NaHCO_3$) and sodium carbonate, and heating the mixture for a predetermined interval at a temperature of about 800 to 860° C. said interval being sufficient to produce a residue containing said uranium and substantially free of carbon.

2. The method of treating carbonaceous material, containing treatment-resistant aggregates of carbon and uranium to separate the uranium from the carbon, which comprises mixing said material with one or more of the class consisting of sodium-chloride, potassium chloride, sodium carbonate, sodium iodide, and sodium fluoride, and heating the mixture for a predetermined time interval at a temperature of at least about 800° C., said interval being sufficient to produce a residue containing said uranium and substantially free of carbon.

3. The method of claim 1 including the additional step of dissolving the residue in nitric acid.

4. The method of claim 1 wherein the mixture of the carbonaceous material and the one or more of the class consisting of sodium chloride, sodium hydrogen carbonate, and sodium carbonate is heated for about two hours.

5. The method of claim 1 wherein the treatment is with sodium chloride and the quantity of sodium chloride in the mixture is approximately equal by weight to the quantity of carbonaceous material.

6. The method of claim 1 wherein the treatment is with sodium carbonate and the quantity of sodium carbonate in the mixture is approximately one-fourth or one-fifth the quantity of carbonaceous material.

7. The method of claim 1 wherein the treatment is with sodium carbonate and the quantity of sodium carbonate in the mixture is less than approximately one-third the quantity of carbonaceous material.

References Cited

UNITED STATES PATENTS

| | | | |
|---|---|---|---|
| 862,987 | 2/1907 | McKnight | 23—319 |
| 2,990,273 | 6/1961 | Chiotti | 75—84.1 |
| 2,992,891 | 7/1961 | Sellers | 23—319 |
| 3,087,779 | 4/1963 | Johnson et al. | 23—324 |
| 3,260,574 | 7/1966 | Hatch et al. | 23—352 |

OTHER REFERENCES

Lange's "Handbook of Chemistry" Handbook Publishers Inc., Sandusky, Ohio, 1946, pp. 252, 253.

CARL D. QUARFORTH, *Primary Examiner.*

R. L. GRUDZIECKI, *Assistant Examiner.*

U.S. Cl. X.R.

23—324, 325, 326, 346, 352